(No Model.) 4 Sheets—Sheet 1.

W. H. MacGREGOR.
PRESSURE GAGE.

No. 292,169. Patented Jan. 22, 1884.

WITNESSES
Willard C. Fogg.
Fred Harris.

INVENTOR
William H. MacGregor
by his attys
Clarke & Raymond (No Model.) 4 Sheets—Sheet 2.
W. H. MacGREGOR.
PRESSURE GAGE.

No. 292,169. Patented Jan. 22, 1884.

WITNESSES
Willard L. Fogg.
Fred Harris

INVENTOR
William H. MacGregor
by his attys
Clarke & Raymond (No Model.) 4 Sheets—Sheet 3.

W. H. MacGREGOR.
PRESSURE GAGE.

No. 292,169. Patented Jan. 22, 1884.

WITNESSES
Willard C. Fogg.
Fred Harris

INVENTOR
William H. MacGregor
by his attys
Clarke & Raymond (No Model.) 4 Sheets—Sheet 4.

W. H. MacGREGOR.
PRESSURE GAGE.

No. 292,169. Patented Jan. 22, 1884.

WITNESSES
Willard C. Fogg.
Fred Harris

INVENTOR
William H. MacGregor
by his attys
Clarke & Raymond

UNITED STATES PATENT OFFICE.

WILLIAM H. MacGREGOR, OF EAST BRAINTREE, ASSIGNOR TO THE ASHCROFT MANUFACTURING COMPANY, OF BOSTON, MASSACHUSETTS.

PRESSURE-GAGE.

SPECIFICATION forming part of Letters Patent No. 292,169, dated January 22, 1884.

Application filed December 18, 1882. (No model.)

*To all whom it may concern:*

Be it known that I, WILLIAM H. MACGREGOR, of East Braintree, in the county of Norfolk and State of Massachusetts, a citizen of the United States, have invented a new and useful Improvement in Pressure - Gages, of which the following is a full, clear, and exact description, reference being had to the accompanying drawings, forming a part of this specification in explaining its nature, in which—

Figures 1, 2, 3, 4:
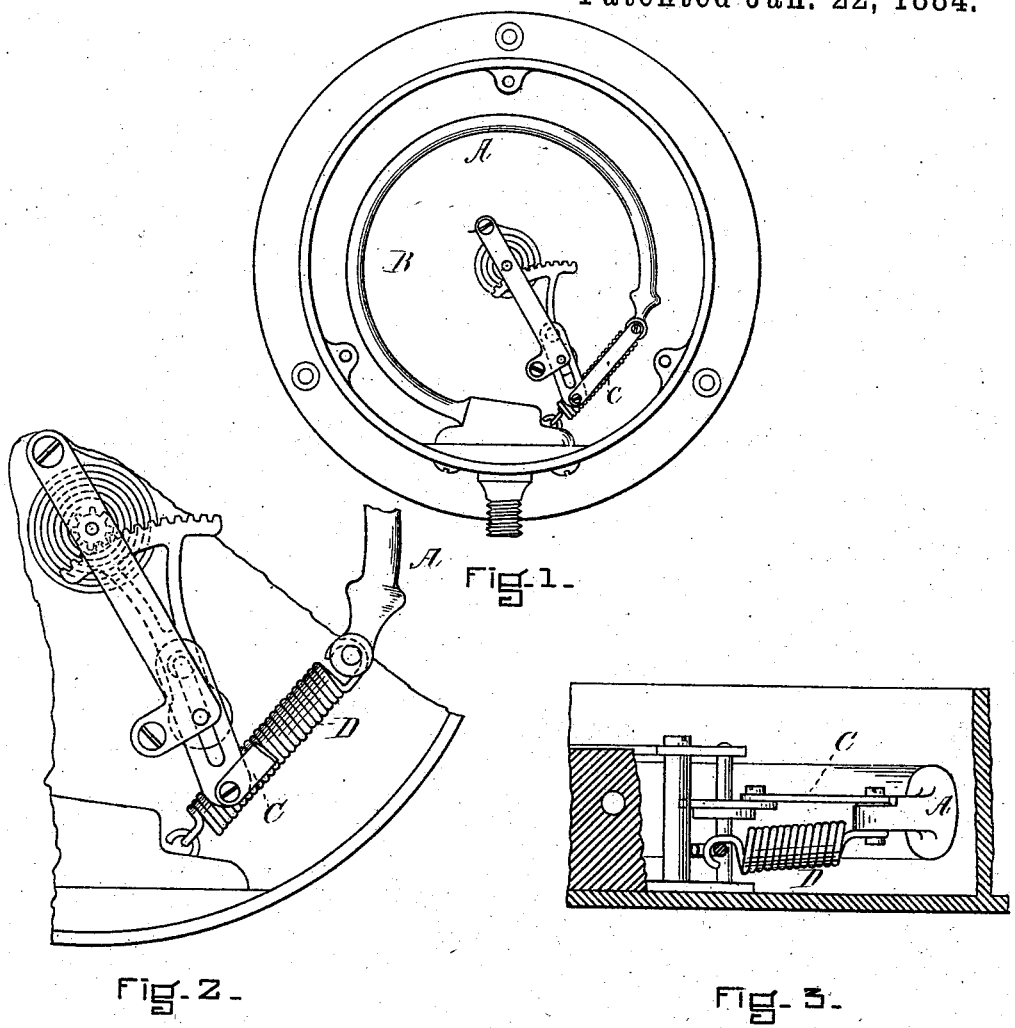
Figure 5:
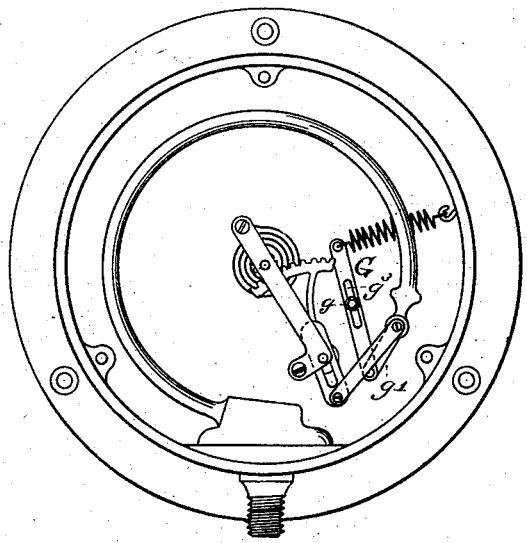
Figure 6:
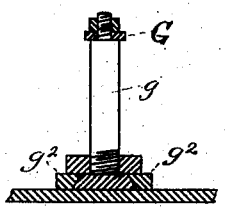
Figure 7:
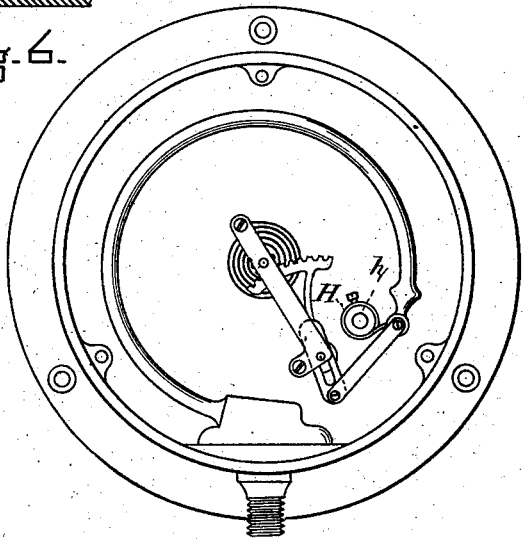
Figure 8:
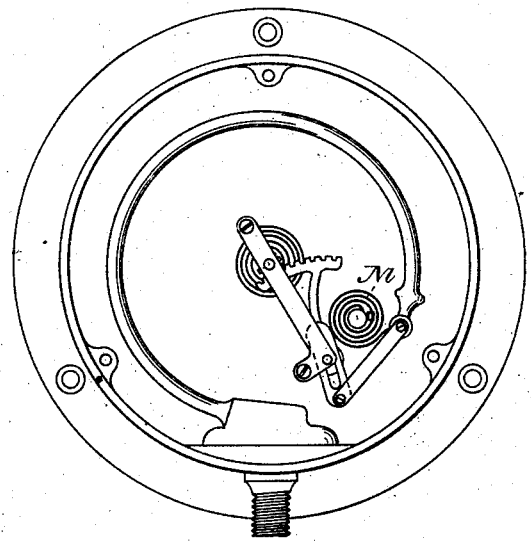
Figure 9:
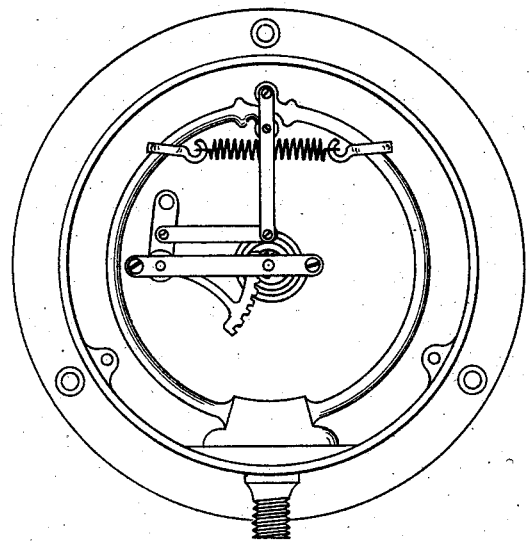
Figure 10:
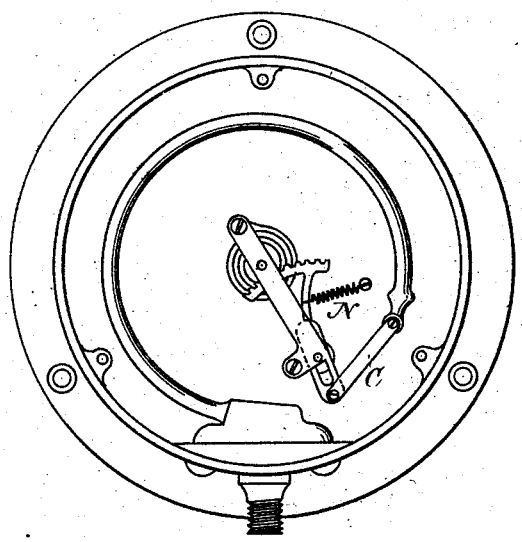

Figure 1 is a front elevation of a steam-gage manufactured by the Ashcroft Manufacturing Company with my improved attachment, the dial and indicator being removed. Fig. 2 is an enlarged view, representing in front elevation a portion of the same gage, the link connecting the Bourdon spring, with the movement being broken off, to show the application of my invention to this form of gage. Fig. 3 is a vertical section of the casing, representing in plan a portion of the gage shown in Fig. 2. Fig. 4 shows, in vertical section, a take up for means for varying the tension of the spring, hereinafter described. Fig. 5 is an elevation of a gage with the dial removed, representing another method of employing my invention. Fig. 6 is a section upon the line $y\ y$ of Fig. 5. Fig. 7 is an elevation representing the use of a coiled spring. Fig. 8 shows the employment of a volute spring. Fig. 9 is a gage having two Bourdon springs containing my improvement. Fig. 10 shows another mode of attaching the regulating-spring.

This invention relates to that class of pressure-gages which employ a pressure-spring; and it consists in the application of an independent co-operating spring at or near the free end of the Bourdon spring.

In steam-pressure gages employing the Bourdon-tube spring the pressure of fluid within the bent flattened tube has a tendency to convert the tube from its oval to a more cylindrical form, and in so doing to straighten out the curves of the spring. The twisted spring described in the English patent to Cowper is now seldom, if ever, used, the ordinary spring being the flattened spring bent into a circular or segmental form; and it is therefore with reference to gages employing this Bourdon spring that my invention will be described. Under heavy pressures, and particularly when the spring is hot, it is apt to take a permanent set, the temper of the spring being drawn at such high heats. This set of the spring is not uncommon on portable engines where the steam-gage is applied directly to the outside of the boiler, instead of to a wall or post at some distance from the boiler, with a column of condensed water interposed between the boiler and the gage; for when placed directly on the outside of the boiler the temperature of the gage is much higher than atmospheric temperature, and the temperature within the sealed case of the gage is higher even than upon the exterior, from which heat is comparatively rapidly radiated into the atmosphere. This tendency to set may be in part or in whole counteracted by employing an independent spring within the case of the gage, preferably of a different metal from that of which the tube is formed, which shall act in aid of the tube and restore it to its normal position at the close of work, thus reseating the hollow spring at its initial-point before it begins to slowly cool. The position to be adopted for this spring is one involving considerable care. As the free end of a Bourdon spring moves in an evolute of a peculiar character, and differing in some degree for almost every length and strength and curvature, and as the independent co-operating spring ought to be of such a character as to pull in every position of the end of the hollow spring, in describing its evolute, at a tangent to the direction of the evolute, this would seem to be a work of considerable difficulty. As, however, the motion of the free end of the hollow spring is in any instance exceedingly small—never for the highest pressures in practice exceeding half an inch, and generally very much less—it has been found in practice that the evolute described by the free end of the spring in actual work does not differ much from an arc of a circle the radius of which does not exceed the diameter of the circle on which the curved hollow spring is struck, and for practical purposes may be assumed as an arc of a circle whose radius is as small as half the radius of the circle on which the spring is struck. If, therefore, the evolute described by the free end of the spring for a given pressure be determined, and the center of a circle of convenient radius substantially coincident at its ends with said evolute be formed, a radius-bar may be pivoted on this center, and also to the free end of the spring, without interfering with the freedom of motion of the free end of the spring, except by the mere impediment of its weight; and if a volute, helical, or other torsional spring be placed on the central arbor of the radius-bar to counteract the unfolding motion of the free end of the hollow spring, a very accurate counterpoise can be effected. I have also discovered that if, in lieu of this radius-bar with a helical spring on the pivot, or the same bar with a spring attached to the case, and acting either by compression or extension to re-seat the hollow spring, I employ a leaf-spring centered at this center of motion, and fastened to the radial bar or to the end of the Bourdon spring, the result does not substantially differ. I have also found that if a spiral spring be extended from the end of the hollow spring to some point in the case in a line substantially tangential to the curve of the spring at its terminus, the result is substantially the same if the spiral spring be of sufficiently large diameter— say a quarter or three-eighths of an inch—and the points of attachment be not made too fine, because the tangent of the evolute between the shortest and the longest point on practical work will lie wholly within the helix; and because, also, by the use of loosely fitting interlocked hook attachments to the case and to the end of the hollow spring a compensation in the direction of the pull of the spring is made. This, therefore, appears to be the best method of applying the compensating-spring, which I prefer, as the simplest and cheapest. There should be at some point in the length of this compensating-spring a means of adjustment, so that in case of emergency its tension may be increased or diminished. Such a means of adjustment would be represented by an ordinary take-up link; but perhaps a still better method, because cheaper, would be to make the hook, which is attached to the case, to pass entirely through the case and have a take-up nut upon the outside, so that the spring could be reset at its initial point, if desired, and the gage reseated without opening the case.

It is well known that the tempers of steel and brass vary differently according to temperatures, and by proper selection of material, or the temper of this compensating or co-operating or supplemental spring the proper compensation can be made. It is also true that corrosion changes the tension and character of the hollow spring, and this corrosion cannot well be prevented, particularly upon the interior of the hollow spring, by any method known to the arts. But it is easy to protect the exterior of this supplemental spring from corrosion either by lacquering or plating; and by means of the take-up its power can be brought into play to supplement the action of the hollow spring, and so compensate for any loss in tension from change either in the temper or structure of the hollow spring.

I am aware that small volute springs of low tension have been used on the pinion-arbor of a gage-movement for many years; but these are only employed to keep the pinion-teeth in contact with the segment gear or rack and eliminate backlash. This invention places a strong spring in direct connection between the free end of the Bourdon tube and the fixed case of the gage, whereby the deterioration in strength of the Bourdon spring may be compensated from time to time, and a comparatively weak Bourdon spring made at first to show the indications of a stronger one. This auxiliary spring would never, in any case, be in the movement unless applied on the arbor or arm of the segment-gear to resist its forward revolution, or on the connecting-rod from the Bourdon tube to the segment-gear for the same purpose.

It is obvious that instead of connecting this auxiliary spring from Bourbon tube to case of gage it will serve its co-operative purpose equally well if connected from one tube to another oppositely-curved tube in a gage of the same type, and be within the specified invention.

Referring to the drawings, A represents a single Bourdon tube; B, the gage-casing; C, the link connecting the free end of the Bourdon tube with the gage-action; D, the auxiliary or supplemental spring, which in this instance is attached to the free end of the Bourdon tube and to the casing of the gage. E represents a hook, to which the spring D may be fastened, and which is capable of being moved or adjusted in relation to the casing of the gage by means of the screw-sleeve F, the sleeve being secured to the casing so that it can be revolved, and having a screw-thread which engages with a screw-thread upon the shank of the hook. If desired, the sleeve can extend through the casing of the gage, so that an adjustment of the spring D may be made from the outside.

In Fig. 5 I show my regulating or adjusting spring attached to the casing of the gage and to the end of the lever G. This lever is pivoted at $g$ to a fulcrum, which may be movable, if desired, and it is connected with the free end of the Bourdon spring by means of the link $g'$. In Fig. 6, I show in section a fulcrum-post, $g$, movable in ways $g^2$, and the fulcrum is movable in the slot $g^3$ in the lever. The fulcrum-post is locked in any desired position by means of a nut. By changing the fulcrum of course the amount of stress or resistance upon the end of the Bourdon spring is varied. In Fig. 7 I represent a spiral spring, H, which is attached at its lower end to a post, $h$, fastened to the casing of the gage. Its free end is secured to the free end of the Bourdon spring. In Fig. 8, I represent a volute spring, M, the free end of which is fastened to the free end of the Bourdon spring. In Fig. 9 I show a gage having two Bourdon springs, which are connected together by means of my regulating or auxiliary spring, as represented. In Fig. 10, I show the auxiliary or regulating spring as operating upon a Bourdon spring through the segment N and link C, this spring being attached at one end to the casing of the gage or other proper place of fastening, and at the other to the segment. These modifications in Figs. 5, 7, 8, 9, and 10 only represent a few of the many ways for applying my invention to get the results desired, and it is obvious that there are many other modes of attaching a spring to the free end of the Bourdon spring to obtain the result desired, and that a great many other forms of springs can be used for the purpose.

I am aware of the Patents No. 126,247, of 1872, to Ashcroft, No. 148,673, of 1874, to Crosby, for registering-gages, and of the use of weak and long-range take-up springs on the registering-movement; but this is not my invention, which requires a constant tension of a short range and comparatively strong spring directly applied without regard to a registering attachment.

I am also aware of the Patent No. 42,873, of 1864, to Ray, which has an adjustable take-up to the backlash-spring; but this, again, does not embody my invention, which is defined in the following claims.

Having thus fully described my invention, I claim and desire to secure by Letters Patent of the United States—

1. In a steam or pressure gage, the combination of a Bourdon tube with a short-range preponderating direct-action spring attached to the free end of the said tube, and adapted to resist by its tension the movement of the free end thereof, and thereby weighing the pressure therein, all substantially as described.

2. In a steam or pressure-gage, the combination of a Bourdon tube, a short-range direct-acting spring attached to the free end of said tube, of sufficient strength to counteract its tendency to set under pressure, all substantially as described.

WILLIAM H. MacGREGOR.

Witnesses:
F. F. RAYMOND, 2d,
WILLARD C. FOGG.